(No Model.)

J. H. FOGARTY.
STEAM TRAP.

No. 310,400. Patented Jan. 6, 1885.

Witnesses:
Charles R. Searle,
M. F. Boyle,

Inventor:
James H. Fogarty
by his attorney
Thomas D. Stetson.

UNITED STATES PATENT OFFICE.

JAMES H. FOGARTY, OF NEW YORK, N. Y.

STEAM-TRAP.

SPECIFICATION forming part of Letters Patent No. 310,400, dated January 6, 1885.

Application filed May 31, 1884. (No model.)

*To all whom it may concern:*

Be it known that I, JAMES H. FOGARTY, of the city and county of New York, in the State of New York, have invented certain new and useful Improvements Relating to Steam-Traps, of which the following is a specification.

The invention is intended more particularly for use on sugar estates, and in analogous situations where a large number of steam vacuum-pans, defecators, and other apparatus receiving heat by steam from a single battery of boilers require to be drained of the water produced by condensation. It has been customary to provide a separate trap for each piece of apparatus.

I have devised a simple and peculiarly efficient trap. I provide separate connections from a single trap at a low level to all the several pieces of apparatus which require to be drained. Each connection is provided with a check-valve, so that the slight inequalities in pressure which momentarily obtain in the apparatus under some conditions can never result in an upflow from the trap to the parts of the apparatus in which there is the lowest pressure.

The following is a description of what I consider the best means of carrying out the invention.

The accompanying drawings form a part of this specification.

Figure 1:
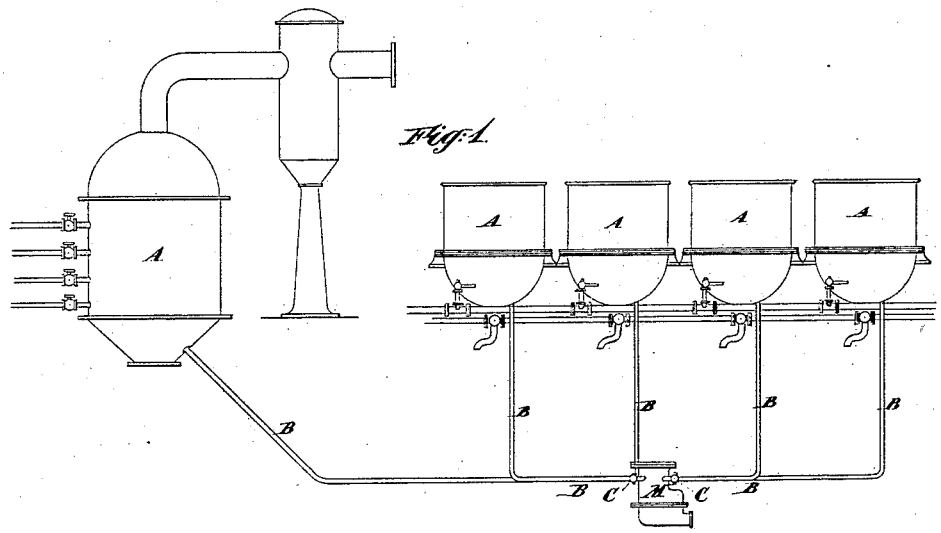
Figure 2:
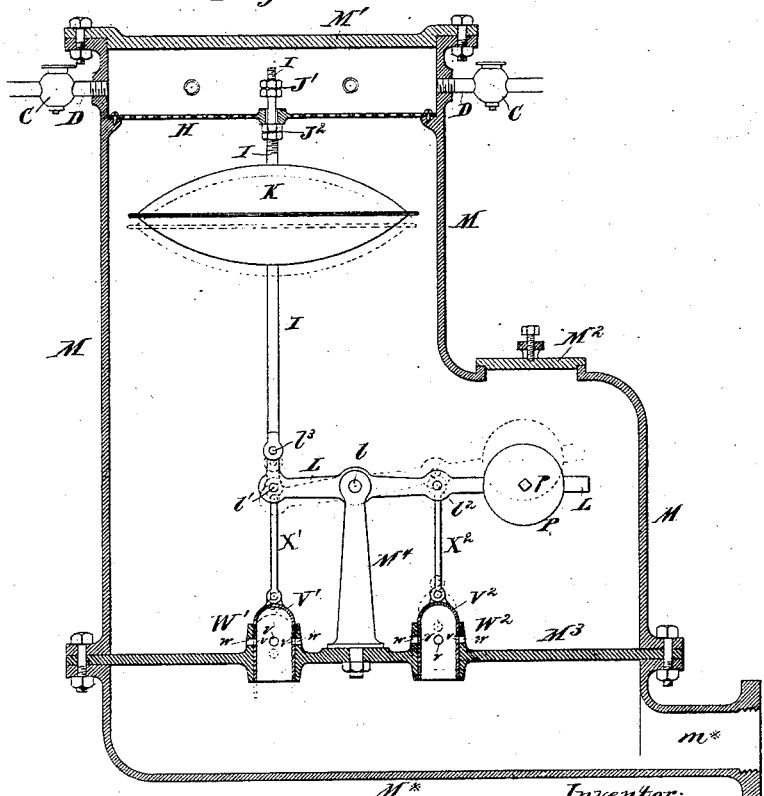

Figure 1 is an elevation showing the trap connected to several different pieces of apparatus. Fig. 2 is a central vertical section through the trap and the immediately-adjacent parts on a larger scale.

Similar letters of reference indicate corresponding parts in both the figures.

A A, &c., are several distinct pieces of apparatus, to which steam is admitted from boilers, (not represented,) and in which the steam is condensed with more or less rapidity.

B B, &c., are the several drain-pipes leading from the lowest portion of the steam-space in each, and connecting each through an independent check-valve, C, with a single trap. The shell or exterior of the trap is marked M, certain portions being designated, when necessary, by additional marks, as $M'$ $M^2$, &c. M is a removable cover; $M^2$, a hand-hole cover; $M^3$, a false bottom, and $M^*$ the bottom proper, provided with a suitable nozzle, $m^*$, to which may be secured the outlet-pipe. Two upright cylinders, $W'$ $W^2$, are tapped into or otherwise firmly secured in the false bottom $M^3$. These cylinders are open at each end and smoothly finished on their interiors. Each is perforated at a certain level with a series of apertures, $w$.

The several check-valves C connect with the trap by pipes D, which may be all on the same level and arranged on any side of the trap. They all communicate above a perforated platform or strainer, H, mounted rigidly in the interior of the trap, and which serves the functions of a strainer to prevent any solid matter from descending into the trap and obstructing the working parts below, and also of guiding a vertically-reciprocating rod, which is operated by a float.

I is a vertical rod. It is equipped with two stops, $J'$ $J^2$, which may be each a nut and jam-nut engaged with threaded portions of the rod I. A rigid stand or upright bracket, $M^4$, fixed on the false bottom $M^3$, supports a pivot, $l$, which carries a vibrating lever, L. On one arm of this lever is fixed a weight, P, which is adjustable on the lever and is held at any desired point by a pinching-screw, $p$.

$V'$ $V^2$ are vertically-reciprocating hollow cylinders, of brass or other suitable material, closed at the upper ends and having perforations $v$, which may be made to coincide in position with the perforations $w$ in the cylinders $W'$ $W^2$. These cylinders $V'$ $V^2$ are connected to pivots $l'$ $l^2$ on the lever L by means of links $X'$ $X^2$.

K is a hollow casing of thin copper or other suitable material serving as a float. It is fixed firmly on the rod I.

Operation: On admitting steam to any or all of the several sets of apparatus A, the steam flows freely through the pipes B, check-valves C, and short connection D, and fills the trap M. If all but one of the sets A are thus connected, only one check-valve C will perform any useful function. That one will remain tightly closed and prevent any flow of steam upward into its connected apparatus A. A like result will follow if the pressure is for any short period less in any one of the sets of apparatus, as when cold juice is first admitted to any defecator or vacuum-pan A A. As the steam condenses in any apparatus A, the water will trickle down through the corresponding connection B, and will accumulate in the bottom of the trap. When there is no water, or only a little water in the trap, the gravity of the float K and its connected rod I will depress the end of the lever L, to which they are connected, elevating the weight P, which must be adjusted so as to only partially balance the gravity of K and I. In this position of the parts the holes $v$ in the cylinders V' V² are out of line with the holes $w$ in the cylinders W' W²; but so soon as the water received from any one or more of the traps has accumulated so as to partially immerse the float K, the weight of the float will be supported, and it will commence to lift on the rod I. When the water-level is still further raised, the buoyancy of the float K, aided by the gravity of the weight P, will, by tilting the lever L, raise the cylinder V' and depress the cylinder V², so as to bring the holes $v$ in each in line with the adjacent holes $w$. The full pressure of the steam in the several sets of apparatus A is felt on the water-surface in the trap, and is actively exerted on the whole interior of the trap. So soon as the holes $v$ come in line with the holes $w$ the water will flow strongly through these holes, moving inward relatively to the cylinders V' V², the water flowing out freely through the bottom of said cylinders, and being conducted away by any suitable means. (Not shown.) When the discharge of the water has lowered the level so that the float K is no longer supported, its gravity will overcome that of the weight P and again tilt the lever L into the position which it originally held, the holes $v$ being out of line with the holes $w$.

It is not essential to the success of the apparatus that the nicely-finished exteriors of cylinders V' V² shall fit tightly in the nicely-finished interiors of the cylinders W' W². It is, under ordinary circumstances, preferable that the fit shall be quite loose. There will always be sufficient condensation in the several sets of apparatus A, and consequently a sufficient inflow of water into the trap, to allow the small amount of leakage which will take place between the loosely-fitted surfaces of these cylinders.

It is not essential that the several sets of apparatus A be all at the same level. There may be great differences of level, even to the extent that one may be at the top of a building and another near the bottom; but it is important that the trap be placed below the level of the lowermost. The several check-valves C should be tight. This is especially important when the trap is set only a little below the lowermost of the several sets of apparatus A. By removing the cover M', access can be had to the upper portion of the trap to remove any solid matter which may have accumulated above the strainer. By removing the hand-hole cover M², access may be obtained to the lower portion of the apparatus. The weight P may be adjusted at any time to balance a greater or less portion of the weight of the float, as circumstances may require. The stops J' J² may be adjusted nearer together or farther apart to limit the greatest motion allowed to the rod I, and consequently to the cylinders V' V².

Modifications may be made in the forms and proportions of the details within wide limits. There may be a pivot, as $l^3$, to which the rod I may be connected separate and distinct from the pivot $l'$, to which the link is connected, which leads to the valve. I prefer such construction, but both can be connected to a single pivot if preferred. The valves V' V² need not be cylinders. They may be of rectangular section or any other form, providing the close-fitting casings W' W² which surround them are similarly modified. I prefer cylinders, and so term them.

I claim as my invention—

1. In combination with a single steam-trap, two or more independent steam-condensing apparatuses, A A, and independent pipe-connections between said trap and each condensing apparatus, as and for the purposes herein specified.

2. In combination with a single steam-trap and two or more independent steam-condensing apparatuses, A A, independent pipe-connections between said trap and each condensing apparatus, and a check-valve, as C, in each independent pipe-connection, as and for the purposes set forth.

3. A steam-trap, M, having a strainer, H, and suitable connections to a series of independent check-valves, C, in combination therewith and with independent connections B, leading to two or more sets of steam-condensing apparatus, A, arranged for joint operation, as herein specified.

4. In a steam-trap, an operating float, K, vibrating lever L, and balancing-weight P, in combination with each other and with two cylinders or valves connected to the lever on opposite sides of the fulcrum, and opening the one with and the other against the pressure of the fluid, all arranged for joint operation, substantially as herein specified.

5. In a steam-trap, the balanced cylinders V' V², working easily in the fixed cylinders W' W², having perforations $w$, connected, as shown, to the controlling-lever L, in combination with the float K, and suitable connecting means, I, arranged for joint operation, substantially as herein specified.

6. The trap M, cylinders W' W², having perforations $w$, controlling-lever L, weight P, screw Q, rod I, stops J' J², float K, and strainer H, in combination with each other and with two or more check-valves, C, pipes B, and steam-condensing apparatus A, arranged for joint operation, substantially as and for the purposes herein specified.

In testimony whereof I have hereunto set my hand, at New York city, N. Y, this 27th day of May, 1884, in the presence of two subscribing witnesses.

JAMES H. FOGARTY.

Witnesses:
CHARLES R. SEARLE,
J. E. RENWEE.